T. L. EGNOR.
CUTTING STICK.
APPLICATION FILED APR. 13, 1912.
1,068,577.
Patented July 29, 1913.
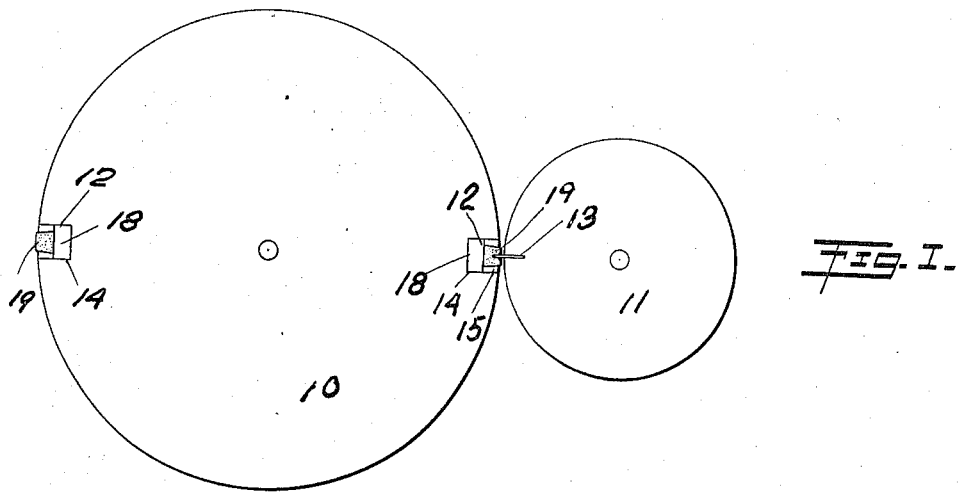
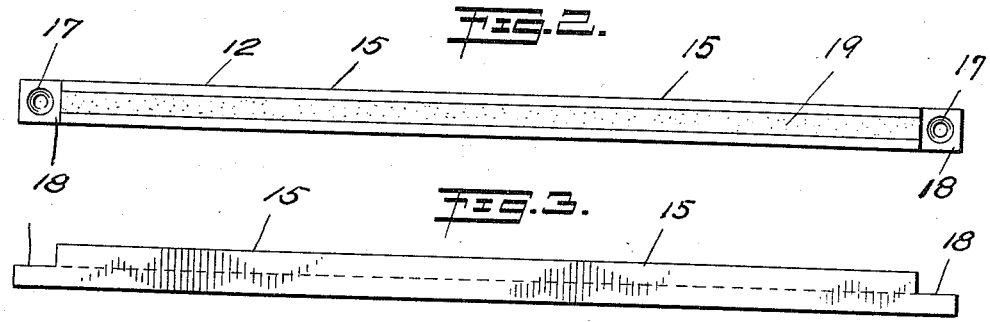
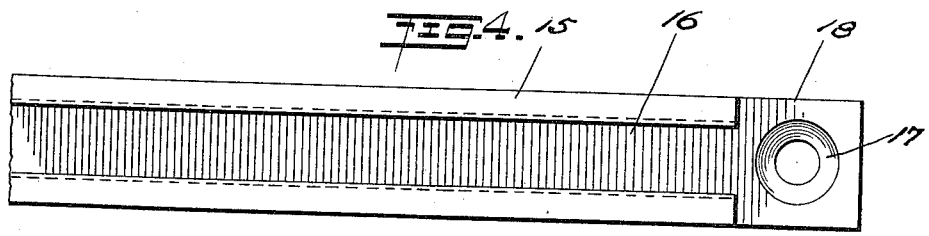
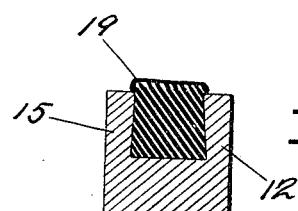
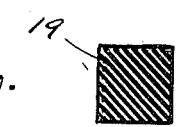
Witnesses:
Frederick D. Ryans
Luella F. Little
Inventor
Theodore L. Egnor
By his Attorney
W. L. Bissing

UNITED STATES PATENT OFFICE.

THEODORE L. EGNOR, OF JERSEY CITY, NEW JERSEY, ASSIGNOR OF ONE-HALF TO GLENN S. WILLIAMSON, OF NEW YORK, N. Y.

CUTTING-STICK.

1,068,577.  Specification of Letters Patent.  Patented July 29, 1913.

Application filed April 13, 1912. Serial No. 690,613.

*To all whom it may concern:*

Be it known that I, THEODORE L. EGNOR, a citizen of the United States, residing in Jersey City, county of Hudson, State of New Jersey, have invented certain new and useful Improvements in Cutting-Sticks, of which the following is a specification.

This invention relates to cutting sticks for cutting cylinders of rotary printing-presses and the like. In a printing-press one or more of these cutting sticks are mounted on a cylinder and coöperate with a knife on an opposed cylinder, to present a bed against which the knife cuts the paper transversely.

The object of the invention is to economize equipment without waste of time in the press room, and to provide a cutting stick of more effective construction than hitherto.

The cutting stick of this invention comprises an elongated holder, which is preferably of steel and is mounted in a groove in the cylinder, said holder being provided with a longitudinal undercut or constricted recess, in which is held an elongated rubber bed, capable of yielding so as to be inserted in or removed from the recess without changing the condition of the holder, which accordingly may advantageously be made in one piece. The rubber bed is held in the recess by the constricted or undercut formation thereof, that is to say, by the expansion of the bed into the wider and lower part of the recess. It is inserted by elongating it so that its diameter is reduced sufficiently to pass the narrowest portion of the recess without undue forcing. The rubber bed is capable of being reinserted in the recess in a turned or reversed position, so as to present a fresh surface to the action of the knife, and the most desirable results are secured by employing a rubber bed which is substantially square in cross-section, each of its four faces being serviceable before the bed is discarded. The holder need not be removed from the cylinder in order to remove and reinsert the rubber bed or to replace it by another.

In accordance with the invention one set of sticks is sufficient for a press room, that is to say, one or two sticks for each of the carrying cutting cylinders, according to the number of sticks that are actually mounted on one cylinder. This is a material advantage over those forms of cutting stick wherein the removing and replacing of the rubber occupies a considerable amount of time, for example, where the rubber is cemented to the body, so that two complete sets of sticks, or extra sticks, must be kept on hand, the change on the press being effected quickly at the expense of extra equipment and the labor of repreparing those sticks not in use. Furthermore, the rubber bed of the cutting stick of this invention, being comparatively thick, is decidedly springy and clears itself of bits and shreds of paper, whereas comparatively thin facings of rubber, which have been employed heretofore, not possessing this life, have soon become packed with debris, necessitating frequent changing. In the present construction, not only does each rubber bed present a number of faces, each of which may be presented to the knife, but each surface is usable for the maximum length of time.

Another advantage of the invention is that the elongated rubber beds being rectangular or approximately rectangular in cross-section, may be made at the printing establishment by simply cutting a sheet of rubber of the proper thickness into strips, preferably of equal breadth and thickness.

Other features and advantages of the invention will become apparent.

In the accompanying drawings illustrating the invention by means of the preferred embodiment thereof: Figure 1 is an end view showing a cylinder with two of the cutting sticks thereon and a coöperating knife cylinder; Fig. 2 is a plan view of the stick; Fig. 3 is a side elevation thereof with the rubber bed removed; Fig. 4 is an enlarged plan view of part of the holder with the rubber bed removed; Fig. 5 is a cross-section through the holder and rubber bed on the same scale as Fig. 4; and Fig. 6 is an end view of the rubber bed in its normal condition, that is to say, the form which it assumes when not confined in the holder.

The numerals 10 and 11 indicate two coöperating cylinders for effecting the transverse cutting of the paper in the printing-press. In general these cylinders may be of any suitable or known construction and operated and coördinated with the remainder of the press mechanism in the usual or desirable manner. The cylinder 10 carries the cutting stick, designated generally by the numeral 12, and it is shown as carrying two of these sticks and as being twice the diameter of the cylinder 11 which carries a knife 13. The particular manner of mounting and operating this knife 13 is not illustrated, because these problems do not affect the present invention, and consequently the knife may be arranged in any usual or suitable manner.

The cutting sticks 12 are mounted in longitudinal grooves 14 in the cylinder 10. It is one of the desirable features of the invention that the holder 15 of the cutting stick may be of the simplest construction. As shown it is an elongated block or bar, preferably of steel, which is provided with a longitudinal recess 16. This recess may be, and preferably is, open at one or both ends. The cutting stick may be held or secured in the groove 14 of the cylinder 10 in any suitable manner. Thus, for example, it may have screw holes 17, at one or both ends, by means of which it may be screwed to the cylinder. It is desirable to cut away the upper part of the holder at one or both ends, as shown at 18, the surface of such portion 18 being preferably flush with or lower than the bottom of the recess 16, to facilitate the dislodgment of the rubber bed 19 at its end in starting the removal of the bed.

The recess 16 is slightly undercut or constricted so as to hold the bed 19 firmly, without cement or other means, the formation of the recess being such as to permit the ready insertion and removal of the bed without, however, altering the condition of the holder, the walls of which remain in permanent fixed relation to each other. In the preferred construction the inside walls of the recess are flat and converge at a comparatively small angle from the bottom to the top. The bottom of the recess is also preferably flat. The rubber bed 19 is angular in cross-section and as shown in Fig. 6 is preferably square when out of the recess, the breadth or thickness of the bed being approximately equal to the width of the recess 16 at the bottom of the latter. The depth of the recess is preferably slightly less than the breadth or thickness of the rubber bed, so that the exposed surface of the latter projects above the holder, as shown more particularly in Fig. 5. The cross-section of the rubber bed, when the exposed surface projects above the holder is greater than that of the recess in the holder.

To remove the rubber bed it is first started from the recess at one end, by use of the fingers or any suitable implement, and is then stretched longitudinally so as to reduce its width, thus enabling it to be stripped quickly from the holder. It may then be turned to present another surface and reinserted, or replaced by another bed, the best mode of insertion being to stretch the bed at one end so that it readily enters the end of the recess, after which the bed is progressively stretched and pushed in the holder at successive regions until all of it is seated in the recess.

What is claimed as new is:

1. A cutting stick to be mounted on a cutting cylinder of a printing-press, comprising an elongated holder with a longitudinal recess having rigid, non-yielding walls, which are in permanently fixed relation and approach each other slightly above the bottom, and an elongated rubber bed normally approximately square in transverse cross-section held in said recess by the constriction thereof and capable of yielding to permit removal and reinsertion for presentation of any of its four faces.

2. A cutting stick to be mounted on a cutting cylinder of a printing-press, comprising an elongated holder with a longitudinal recess which is slightly constricted and a one-piece elongated rubber bed of rectangular transverse cross section and extending throughout the length of the holder held in and by said recess and capable of yielding sufficiently to permit removal and reinsertion for presentation of another of its faces without changing the condition of the holder.

3. A cutting stick comprising an elongated holder having a longitudinal recess with rigid, non-yielding walls the inside walls of which are in permanently fixed angular relation, converging slightly from the bottom to the top, and a one-piece elongated rubber bed extending throughout the length of the holder normally substantially square in cross-section held in and by said recess.

4. The combination of a cutting cylinder having a groove therein, an elongated holder mounted in said groove and having a longitudinal recess with rigid, non-yielding walls which are slightly constricted, and an elongated rubber bed extending along said holder held in and by said recess and capable of yielding sufficiently to permit removal and reinsertion for presentation of another of its faces without changing the condition of the holder or removing it from the cylinder.

5. The combination of a cutting cylinder having a groove therein, an elongated holder mounted in said groove and having a longitudinal recess with slightly converging rigid walls, and an elongated rubber bed of rectangular cross section insertible in and removable from said recess without removing the holder from the cylinder.

6. The combination of a cutting cylinder having a groove therein, an elongated holder mounted in said groove and having a longitudinal recess with rigid non-yielding walls, which are inclined so as to form a constricted recess and an elongated, one-piece rubber bed extending along said holder and of square cross section, the thickness of the rubber bed being normally greater than the depth of the recess and wider than the mouth of the recess, said rubber bed being capable of yielding sufficiently to permit removal and re-insertion for presentation of another of its faces without changing the condition of the holder or removing it from the cylinder.

7. A cutting stick comprising an elongated holder having a longitudinal recess with rigid non-yielding walls, the inside walls of which are in permanently fixed angular relation, converging slightly from the bottom to the top and a one-piece, elongated rubber bed of square cross-section, extending throughout the length of the holder, the cross-section of the rubber bed being normally greater than that of the recess in the holder, said rubber bed being held in said recess by the expansion of the bed into the wider part of the recess.

In testimony whereof, I have signed my name to this specification, in the presence of two subscribing witnesses.

THEODORE L. EGNOR.

Witnesses:
FREDERIC KUNZ,
LOUELLA F. LITTLE.

---

Copies of this patent may be obtained for five cents each, by addressing the "Commissioner of Patents, Washington, D. C."